(12) United States Patent
Davis et al.

(10) Patent No.: US 6,925,503 B2
(45) Date of Patent: Aug. 2, 2005

(54) METHOD AND SYSTEM FOR PERFORMING A LONGEST PREFIX MATCH SEARCH

(75) Inventors: Gordon Taylor Davis, Chapel Hill, NC (US); Clark Debs Jeffries, Durham, NC (US); Grayson Warren Randall, Cary, NC (US); Sonia Kiang Rovner, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 736 days.

(21) Appl. No.: 09/916,766

(22) Filed: Jul. 27, 2001

(65) Prior Publication Data

US 2003/0023581 A1 Jan. 30, 2003

(51) Int. Cl.[7] ............................................. G06F 15/173
(52) U.S. Cl. ...................... 709/238; 709/234; 709/244
(58) Field of Search .............................. 709/238, 244, 709/234

(56) References Cited

U.S. PATENT DOCUMENTS

| | | | |
|---|---|---|---|
| 5,546,390 A | 8/1996 | Stone ............................ 370/60 |
| 6,011,795 A | 1/2000 | Varghese et al. ............. 370/392 |
| 6,012,061 A | 1/2000 | Sharma ........................ 707/100 |
| 6,014,659 A | 1/2000 | Wilkinson, III ................ 707/3 |
| 6,018,524 A | 1/2000 | Turner et al. ................ 370/392 |
| 6,052,683 A | 4/2000 | Irwin ............................ 707/8 |
| 6,061,679 A | 5/2000 | Bournas et al. ................ 707/3 |
| 6,061,712 A * | 5/2000 | Tzeng ........................ 709/202 |
| 6,067,574 A * | 5/2000 | Tzeng ........................ 709/247 |
| 6,223,172 B1 * | 4/2001 | Hunter et al. .................. 707/3 |
| 6,457,061 B1 * | 9/2002 | Bal et al. ..................... 709/245 |
| 6,778,532 B1 * | 8/2004 | Akahane et al. ............ 370/392 |

FOREIGN PATENT DOCUMENTS

| | | | | |
|---|---|---|---|---|
| JP | 2000332786 A | * | 11/2000 | ........... H04L/12/28 |
| JP | 2000358064 A | * | 12/2000 | ........... H04L/12/56 |

* cited by examiner

Primary Examiner—Viet D. Vu
Assistant Examiner—Nghi Tran
(74) Attorney, Agent, or Firm—Sawyer Law Group LLP

(57) ABSTRACT

A method and system for finding a longest prefix match for a key in a computer network is disclosed. The method and system include providing a main engine and providing an auxiliary engine. The main engine is for storing a first plurality of addresses and for searching the first plurality of addresses for the longest prefix match for the key. None of the first plurality of addresses is a prefix for another address of the first plurality of addresses. The auxiliary engine is for storing and searching a second plurality of addresses. A first address of the second plurality of addresses is capable of including the prefix for a second address of the first plurality of addresses or for a third address for the second plurality of addresses. None of the first plurality of addresses is the prefix for any of the second plurality of addresses. Each of the second plurality of addresses is distinct from each of the first plurality of addresses.

24 Claims, 7 Drawing Sheets

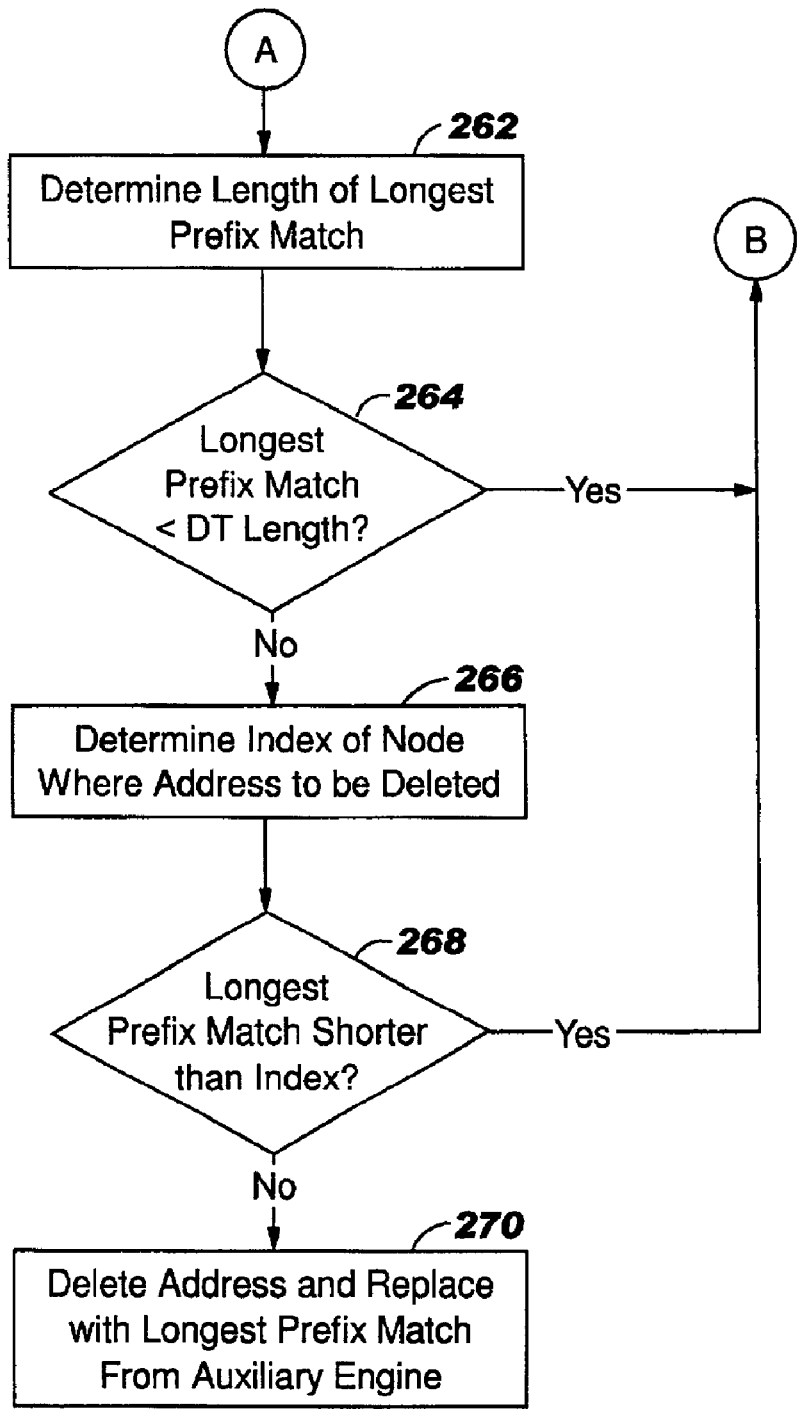

METHOD AND SYSTEM FOR PERFORMING A LONGEST PREFIX MATCH SEARCH

FIELD OF THE INVENTION

The present invention relates to computer systems, and more particularly to a method and system for performing a longest prefix match that more efficiently utilizes the resource of the computer system.

BACKGROUND OF THE INVENTION

Driven by increasing usage of a variety of network applications, such as those involving the Internet, computer networks are of increasing interest. FIG. 1A depicts a computer network 1 as coupled to the Internet 30. The computer network 1 includes gateways 12 and 25 as well as switches 10 and 14. The switches 10 and 14 are coupled to hosts 2, 4 and 6 and hosts 16 and 18, respectively. The switches 10 and 14 are also coupled to servers 7 and 8 and server 20, respectively.

The switches 10 and 14 are often used to couple portions of the network 1 together, as well as to couple different networks together. FIG. 1B depicts a high-level block diagram of a switch 10 which can be used in a computer network such as the network 1. The switch 10 includes a switch fabric 43 coupled with blades 47, 48 and 49. Each blade 47, 48 and 49 is generally a circuit board and includes at least a network processor 42 coupled with ports 44. Thus, the ports 44 are coupled with hosts (not shown in FIG. 1B). The blades 47, 48 and 49 can provide traffic to the switch fabric 43 and accept traffic from the switch fabric 43. Thus, any host connected with one of the blades 47, 48 or 49 can communicate with another host connected to another blade 47, 48 or 49 or connected to the same blade. Although shown only in the switch 10, the network processor 42 may also be used in a router or other mechanism for transmitting packets.

In order to transmit traffic through the network 1, the addresses of the destinations for data packets utilized. Typically, the data packets are IP packets ("packet"), each of which has an IP address. The IP address, which is thirty-two bits long, is typically used for determining how to route the packet. The IP address, hereinafter termed the key, is then compared to a set of known addresses by the network processor 42 in order to determine the destination and how to forward the packet. This comparison is made using a longest prefix match search, which finds the closest match to the key from a set of stored addresses available to the network processor 42.

FIG. 2 depicts a conventional method 50 for forwarding a packet using a longest prefix match. The method 50 is typically used by a network processor 42 that resides in a switch, router or other component that forwards packets. A search of a tree including stored addresses is performed in order to find the longest prefix match, via step 52. The longest prefix match is a stored address which is the closest match to the key. The longest prefix match need not be an exact match for the key. The longest prefix match is typically the stored address which matches the most significant bits of the key. The type of tree used in step 52 is typically a Patricia tree. The search performed in step 52 typically searches bit by bit. For example, a first bit of the key is tested to determine its value. Based on the outcome of the test of a particular bit, if the bit is a one or a zero, another bit is tested. This process continues until the stored address that matches the most bits of the key is found.

FIG. 3 depicts a Patricia tree 60. For clarity, the Patricia tree 60 is shown as testing only a relatively small number of bits. The Patricia tree 60 includes nodes 62, 64, 70 and 74, branches 63, 65, 66, 69, 71, 72, 75 and 76 and leaves 67, 68, 73, 77 and 78. The nodes 62, 64, 70 and 74 are where bits of the key are tested. The branches 63, 65, 66, 69, 71, 72, 76 and 76 represent pointers to the next bit to test and the value of the bit tested. The leaves 67, 68, 73, 77 and 78 represent stored addresses. The stored addresses at the leaves 67, 68, 73, 77 and 78 could be a full IP address having 32 bits or could be a prefix for an IP address, such as the address for the router used to connect to certain IP addresses. For example, the prefix might include only twenty-four bits. The stored addresses may include prefixes because a particular network processor 42 may have knowledge of only some of the components of the network 1. Using the stored addresses known by the network processor 42, the IP packet can be forwarded to a known point in the network that is close to the destination of the IP packet indicated by the key. Thus, a longest prefix match is used to ensure that the IP packet travels closer to the destination indicated by the key for the IP packet.

Using the Patricia tree 60, step 52 of the method 50 would be performed. Referring to FIGS. 2 and 3, a first bit in the key, bit A, is tested at node 62. If bit A is a one, then branch 63 is taken to node 64. Based on the test of bit B at the node 64, the address A1 or A2 is obtained as the longest prefix match. Thus, if bit B is a one, then the address A2 on leaf 68 is used. If bit B is a zero, then the address A1 on the leaf 67 is used. The addresses A1 and A2 may be complete IP addresses, or may be prefixes. If it is determined that bit A at node 62 is a zero, then branch 69 is taken to node 70, where bit C is tested. If bit C is a one, then address A3 at leaf 73 is determined to be the longest prefix match for the key. If bit C is a zero, then bit D at node 74 is tested. If bit D is a zero then address A4 of leaf 77 is the longest prefix match. However, if bit D is a one, then address A5 of leaf 78 is determined to be the longest prefix match for the key. As discussed above, the address A1, A2, A3, A4 or A5 that is the longest prefix match may simply be a prefix for the key, rather than an exact match of the key.

Referring back to FIG. 2, once the longest prefix match of the key is found, the longest prefix match is used to forward the IP packet, via step 54. Thus, using the method 50, the longest prefix match for a particular key (IP address) of a packet is found. The longest prefix match could theoretically be as short as one bit or as long as the key when an exact match is found. The longest prefix match is then used to forward the IP packet to a point in the network that is closer to the destination of the IP packet. The method 50 can then be repeated by another component, such as another router or switch, to continue to move the IP packet closer to the destination. The method 50 can also be repeated by the network processor 42 for other IP packets traveling through the network 1.

Referring to FIGS. 1A, 1B, 2 and 3, although the method 50 using the Patricia tree 60 functions, one of ordinary skill in the art will readily recognize that there are drawbacks to performing the longest prefix match search using the method 50. The Patricia tree 60 requires a relatively large amount of memory, which is undesirable. The Patricia tree 60 actually includes only stored addresses, some of which are prefixes. However, space to store other complete IP addresses as well as other prefixes must also be allocated for the Patricia tree 60. For example, suppose the address A3 is a prefix having only twenty-four significant bits. In FIG. 3, all nodes, such as the nodes 62, 64, 70 and 74, must allow space to point to subsequent nodes and leaves. Leaves holding prefixes are usually very few and far between. Thus, the nodes 62 and 70 include prefixes 79 and 80, whereas nodes 64 and 74 contain empty space holders for prefixes. Providing this space consumes a relatively large amount of memory (not explicitly shown). One way to reduce space consumption when implementing the Patricia tree 60 and the method 50 is to use different node types, one type for nodes that contain prefixes as well as next node pointers when prefixes exist and another type for nodes that contain next node pointers without prefixes when prefixes do not exist. This makes implementation of the method 50 and the Patricia tree 60 more onerous for a developer.

Accordingly, what is needed is a system and method for forwarding an IP packet using a longest prefix match search. The present invention addresses such a need.

SUMMARY OF THE INVENTION

The present invention provides a method and system for finding a longest prefix match for a key in a computer network. The method and system comprise providing a main engine and providing an auxiliary engine. The main engine is for storing a first plurality of addresses and for searching the first plurality of addresses for the longest prefix match for the key. None of the first plurality of addresses is a prefix for another address of the first plurality of addresses. The auxiliary engine is for storing and searching a second plurality of addresses. A first address of the second plurality of addresses is capable of including the prefix for a second address of the first plurality of addresses or for a third address for the second plurality of addresses. None of the first plurality of addresses is the prefix for any of the second plurality of addresses. Each of the second plurality of addresses is distinct from each of the first plurality of addresses.

According to the system and method disclosed herein, the present invention provides an efficient mechanism for finding a longest prefix match that consumes less memory and is simpler to implement.

BRIEF DESCRIPTION OF THE DRAWINGS

FIGS. 7A and 7B a more detailed flow chart of one embodiment of a method in accordance with the present invention for removing addresses from the system in accordance with the present invention.

DETAILED DESCRIPTION OF THE INVENTION

The present invention relates to an improvement in computer networks. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for finding a longest prefix match for a key in a computer network. The method and system comprise providing a main engine and providing an auxiliary engine. The main engine is for storing a first plurality of addresses and for searching the first plurality of addresses for the longest prefix match for the key. None of the first plurality of addresses is a prefix for another address of the first plurality of addresses. The auxiliary engine is for storing and searching a second plurality of addresses. A first address of the second plurality of addresses is capable of including the prefix for a second address of the first plurality of addresses or for a third address for the second plurality of addresses. None of the first plurality of addresses is the prefix for any of the second plurality of addresses. Each of the second plurality of addresses is distinct from each of the first plurality of addresses.

The present invention will be described in terms of a particular network, certain components, such as a switch, and a particular network processor. However, one of ordinary skill in the art will readily recognize that this method and system will operate effectively for other networks, other components, such as routers, and other network processors. The present invention will also be described in the context of particular methods. However, one of ordinary skill in the art will readily recognize that the present invention is consistent with other methods having different or additional steps. The present invention will also be described in the context of IP packets. However, one of ordinary skill in the art will readily recognize that the present invention is applicable to other situations in which a best match that need not be an identical match is to be found. For example, the present invention is described in the context of storing addresses and searching for the longest prefix match for a key (IP address) for an IP packet. However, the present invention is consistent with storing other quantities and searching the stored quantities for a closest match to another item.

Figure 1A:
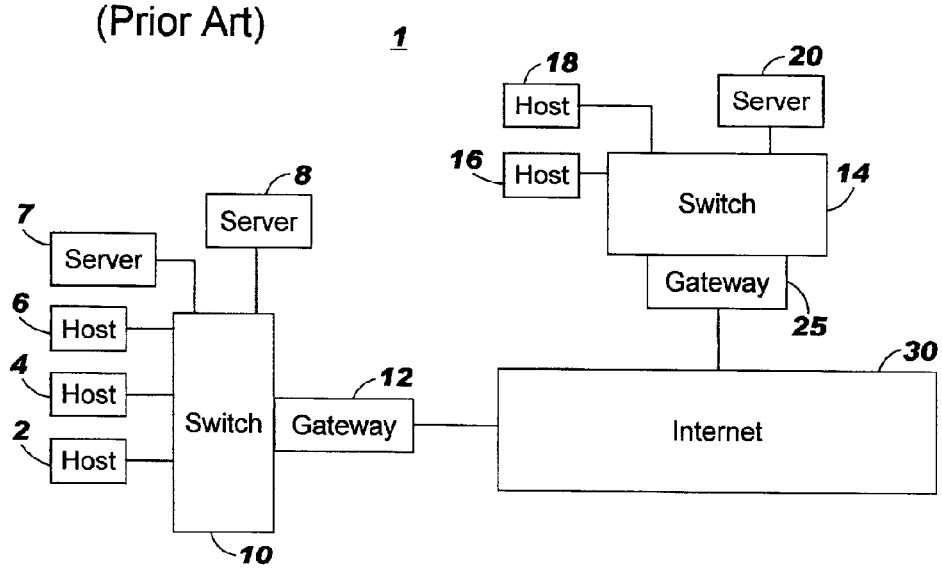
FIG. 1A is a block diagram of a conventional network.
Figure 1B:
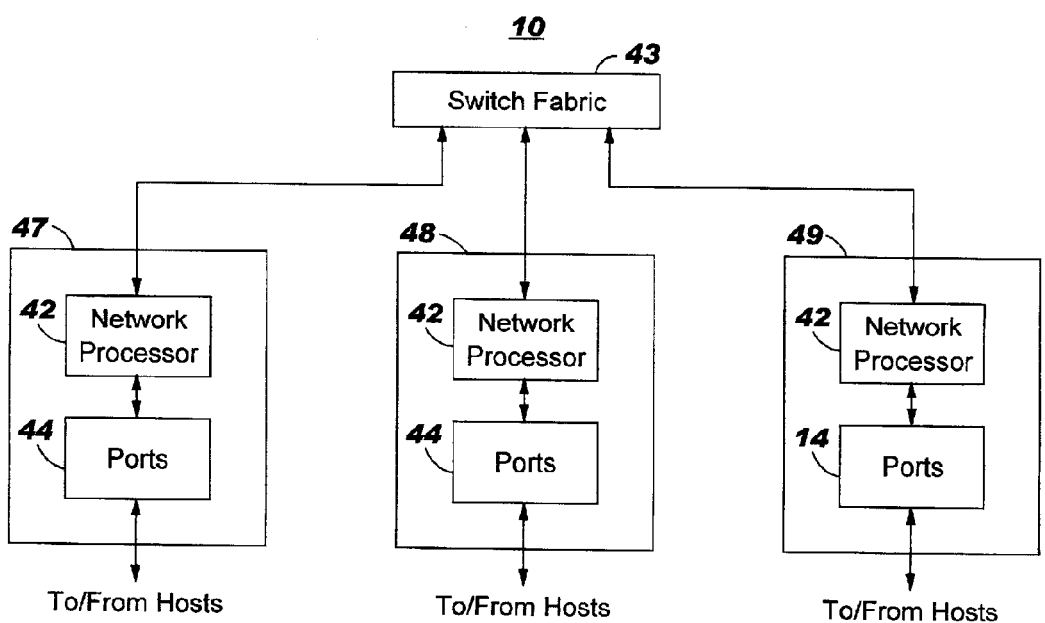
FIG. 1B depicts a high-level block diagram of a switch 10 which can be used in a computer network such as the network 1.
Figure 2:
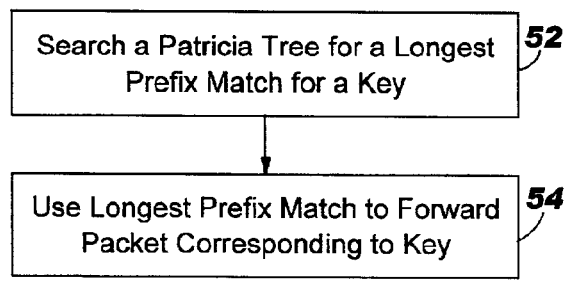
FIG. 2 depicts a conventional method for forwarding a packet using a longest prefix match.
Figure 4:
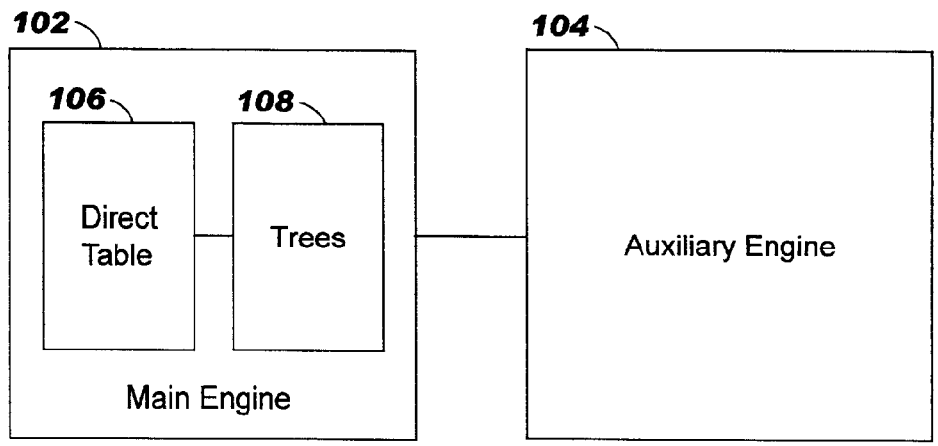
FIG. 4 is a block diagram depicting one embodiment of a system in accordance with the present invention that determines a longest prefix match.

To more particularly illustrate the method and system in accordance with the present invention, refer now to FIG. 4, depicting one embodiment of a system 100 in accordance with the present invention that determines a longest prefix match. The system 100 is preferably used by the network processor 42 depicted in FIG. 1B. Thus, the system 100 is preferably used in a switch 10, router or other component that is to forward IP packets through a network. The system 100 includes a main engine 102 and an auxiliary engine 104. The main engine 102 and the auxiliary engine 104 would be used to store entries, preferably IP addresses, which are known to the system 100. The main engine 102 stores some of these addresses, while the auxiliary engine 104 stores other of these addresses. However, if an address is stored in the main engine 102, the address is not stored in the auxiliary engine 104. Similarly, if an address is stored in the auxiliary engine 104, the address is not stored in the main engine 102. Thus, no address stored in the system 100 is a duplicate of another address stored in the system 100. Stated differently, each address stored in the system 100 is distinct. The main engine 102 stores addresses which are not prefixes of another address by the system 100. Thus, if an address is stored in the main engine 102, the address is not a prefix of another address stored in the main engine 102 and is not a prefix of an address stored by the auxiliary engine 104. A prefix is an address which exactly matches a portion of another address stored by the system 100. However, a prefix of an address does not include duplicates of the address. In one embodiment, the main engine 102 stores all of the addresses which are not prefixes of another entry. In a preferred embodiment, the main engine 102 stores all of the addresses that are not prefixes of another stored address and that have at least a particular minimum length, preferably sixteen bits The auxiliary engine 104 stores addresses which can be prefixes for other addresses stored by the system 100. Thus, an address stored by the auxiliary engine could match some portion of an address stored by the main engine 102 and could match some portion of another address stored by the auxiliary engine 102.

In a preferred embodiment, the auxiliary engine might be a content addressable memory ("CAM") or a direct table. In a preferred embodiment, the main engine 102 includes a direct table 106 having a plurality of table entries and trees 108. Each of the trees 108 is preferably a Patricia tree. The main engine 102 preferably stores addresses having at least a certain length. In a preferred embodiment, where the longest prefix match for a thirty-two bit IP address is to be found, addresses stored in the main engine 102 must have a length of at least sixteen bits. However, another length could be used. The direct table is preferably indexed using the minimum length of the addresses stored in the main engine 102. The direct table 106 thus has entries indexed by the first sixteen bits of the addresses that could be stored at the table entry. If more than one address having the same first sixteen bits is stored in the main engine 102, then a tree of the trees 108 is attached to the table entry corresponding to the first sixteen bits of the address. Each of the trees 108 includes nodes, branches and leaves (not explicitly shown) that allow the addresses stored in the main engine and having the same first sixteen bits to be distinguished.

Because the main engine 102 and the auxiliary engine 104 store address known by the system 100, the main engine 102 and the auxiliary engine 104 can be searched in order to find a longest prefix match for a key of a packet that is being forwarded using the system 100.

Figure 5:
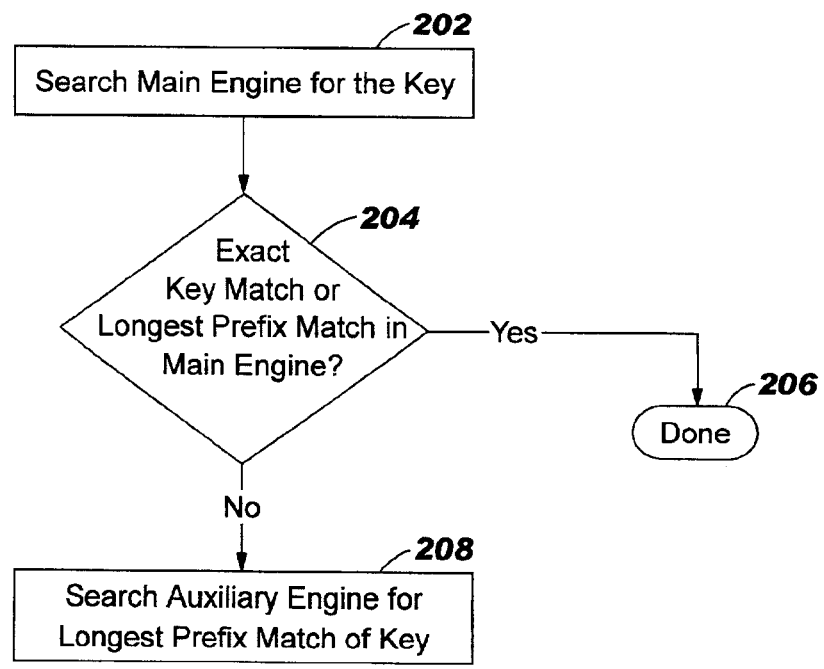
FIG. 5 is a high-level flow chart depicting one embodiment of a method in accordance with the present invention for performing a longest prefix match search using the system in accordance with the present invention.

FIG. 5 depicts a high level flow chart of a method 200 in accordance with the present invention for performing a longest prefix match search using the system 100 in accordance with the present invention. In a preferred embodiment, the key for which the longest prefix match is searched is the IP address for a packet. A search of the main engine 102 for the key is performed, via step 202. Preferably, step 202 includes using the first sixteen bits of the key to locate a particular entry in the direct table 106, then using the remainder of the key, if necessary, to obtain either an exact match for the key or the longest prefix match for the key. This step could also include utilizing one of the trees 108, if any, attached to the particular entry. It is determined whether an exact match of the key or the longest prefix match for the key was found in the main engine 102, via step 204. If so, the method terminates in step 206. The packet can then be forwarded using the longest prefix match. If the exact match or longest prefix match for the key was not found in the main engine 102, then the auxiliary engine 104 is searched for the longest prefix match, via step 208.

Thus, the main engine 102 is searched for the longest prefix match first. Only if the longest prefix match is not found is the auxiliary engine 104 searched. The main engine 102 can be searched relatively quickly because the main engine 102 will not store all of the addresses stored by the system 100. Moreover, it is generally more likely that an exact match or a closer match (sixteen bits or greater) will be found. The auxiliary engine, therefore, is not searched as often as the main engine 102. Thus, the search performed using the method 200 may be relatively fast and efficient. In addition, the main engine 102 needs to be able store a smaller number of addresses and prefixes (in a preferred embodiment, only those which are at least sixteen bits long and which are not prefixes of another address). As a result, less memory may be consumed by the main engine 102. Furthermore, implementation of the system 100 102 may be made simpler. Because the main engine 102 does not store prefixes of other addresses stored by the system 100, different control blocks need not be provided for different portions of the main engine 102. Instead, control blocks for prefixes of other addresses can be used in the auxiliary engine 104 only, while control blocks for addresses are used only in the main engine 102.

Figure 3:
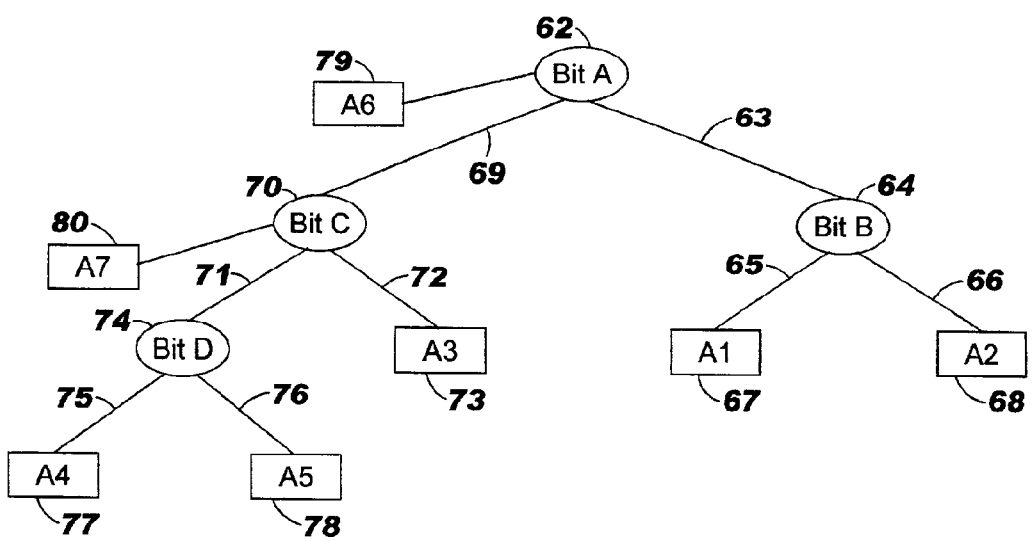
FIG. 3 depicts a conventional Patricia tree.
Figure 6A:
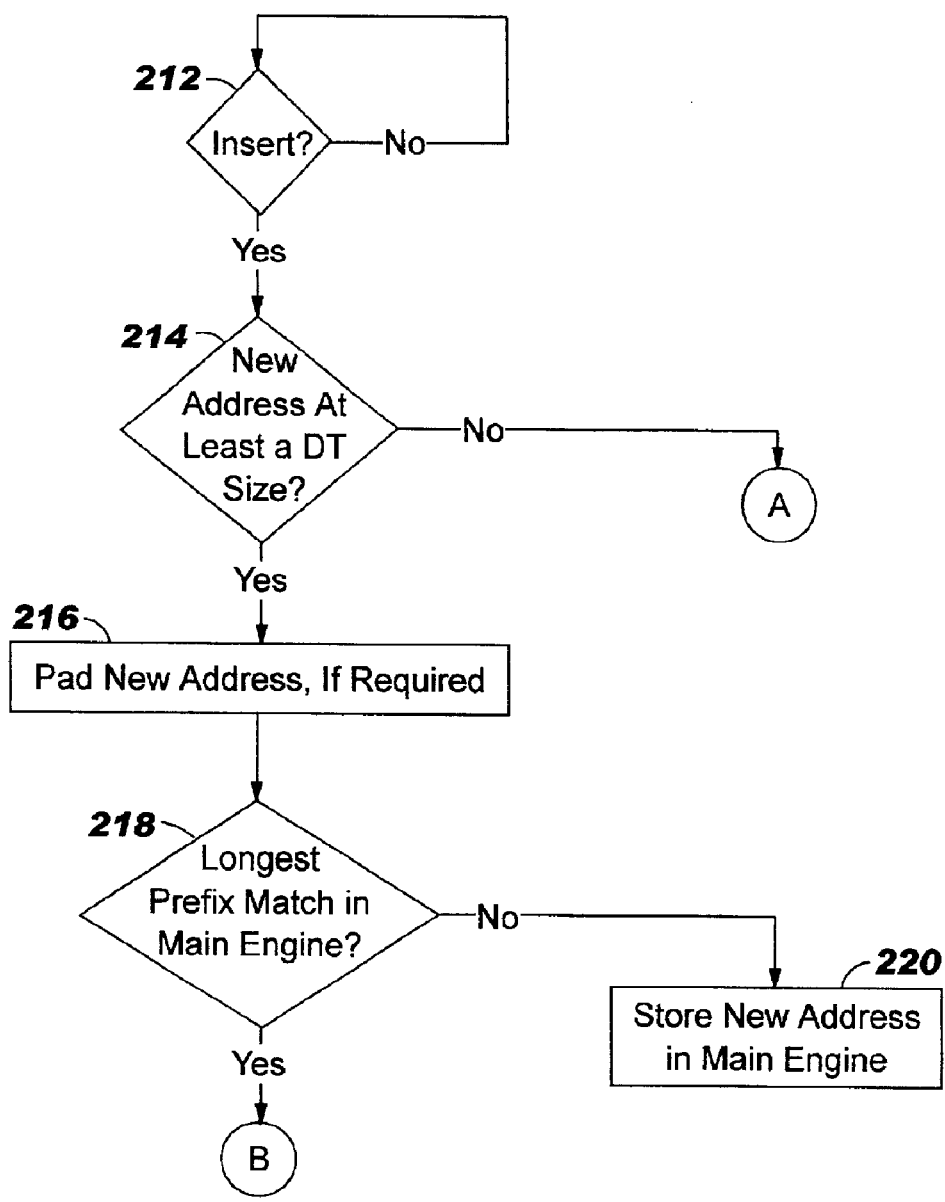
FIGS. 6A and 6B depict a more detailed flow chart of one embodiment of a method in accordance with the present invention for adding addresses to the system in accordance with the present invention.
Figure 6B:
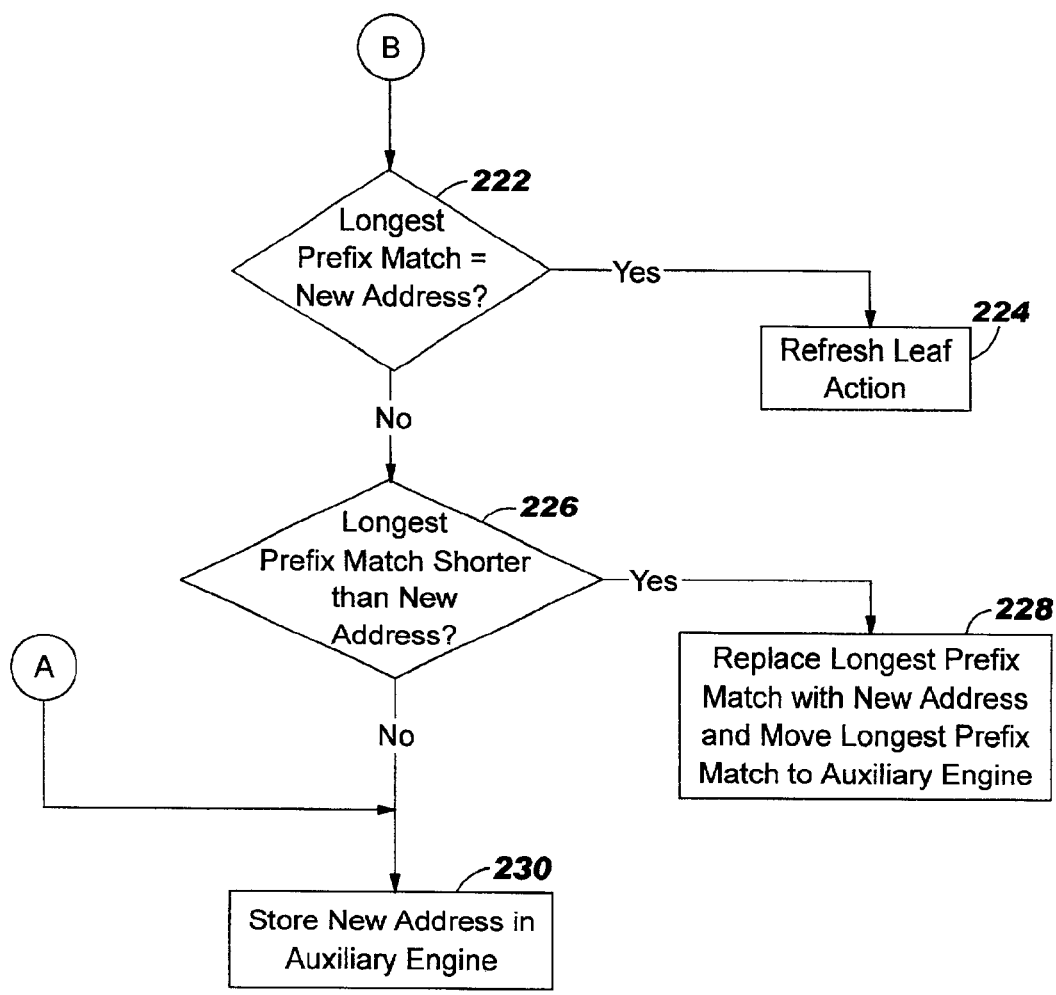

FIGS. 6A and 6B depict a more detailed flow chart of one embodiment of a method 210 in accordance with the present invention for adding addresses to the system 100 in accordance with the present invention. Thus, the method 210 will be described in conjunction with FIG. 3. Referring to FIGS. 4 and 6, the method 210 allows addresses to be added to the main engine 102 or the auxiliary engine 104 and preserve the properties of the main engine 102 and the auxiliary engine 104. It is determined whether a new address is to be inserted into the system 100, via step 212. If not, step 212 is repeated. Otherwise, it is determined whether the new address is at least a particular, minimum length, via step 214. This minimum length is also known as the direct table length ("DT length"). The DT length is the minimum length of an entry in the direct table. In a preferred embodiment, the particular length is sixteen bits. If the new address is not at least the particular length, then the new address is stored in the auxiliary engine, via step 230. If the new address is at least the particular length, new address is padded, if necessary in order to reach a particular length, via step 216. For example, the maximum length possible for IP addresses is currently thirty-two bits. Thus, the system 100 is preferably configured to be able to store and utilize thirty-two bit addresses. However, a particular IP address may have fewer bits. If the new address to be stored has less than thirty-two bits, for example sixteen or twenty-four bits, then the new address is padded until it reaches thirty-two bits. Generally, the new address will be padded by adding zeroes to the end of the new address.

It is then determined whether there is a longest prefix match for the new address in the main engine 102, via step 218. In step 218, therefore, the addresses stored in the main engine 102 are searched to determine whether there is a longest prefix match available. The longest prefix match is the address in the main engine 102 that matches the most bits of the new address. If there is no longest prefix match, then the new address is stored in the main engine 102, via step 220. If there is a longest prefix match in the main engine, it is determined whether the longest prefix match has the same length as the new address, via step 222. If so, then the new address is a duplicate of the longest prefix match. Thus, the leaf action is simply refreshed, via step 224. If the longest prefix match is not the same length, then it is determined whether the longest prefix match in the main engine 102 is shorter than the new address, via step 226. If the longest prefix match is shorter, then the new address is stored in the main engine and the longest prefix match is moved to the auxiliary engine 104, via step 228. Step 228 moves the longest prefix match to the auxiliary engine 104 in order to retain the above-mentioned properties of the main engine 102, that no address in the main engine 102 is a prefix of another address in the main engine 102. If the longest prefix match is not shorter than the new address, the longest prefix match must be longer than the new address. Thus, the new address is stored in the auxiliary engine 104, via step 230.

Thus, the method 210 allows new addresses to be stored in the system 100, while retaining the properties of the main engine 102 and the auxiliary engine 104. Thus, the main engine will continue to store only those addresses which are not prefixes of other addresses in the system 100 and, in a preferred embodiment, which have at least a minimum length. Thus, searching and implementation of the main engine 102 remain faster and more efficient.

Figure 7A:
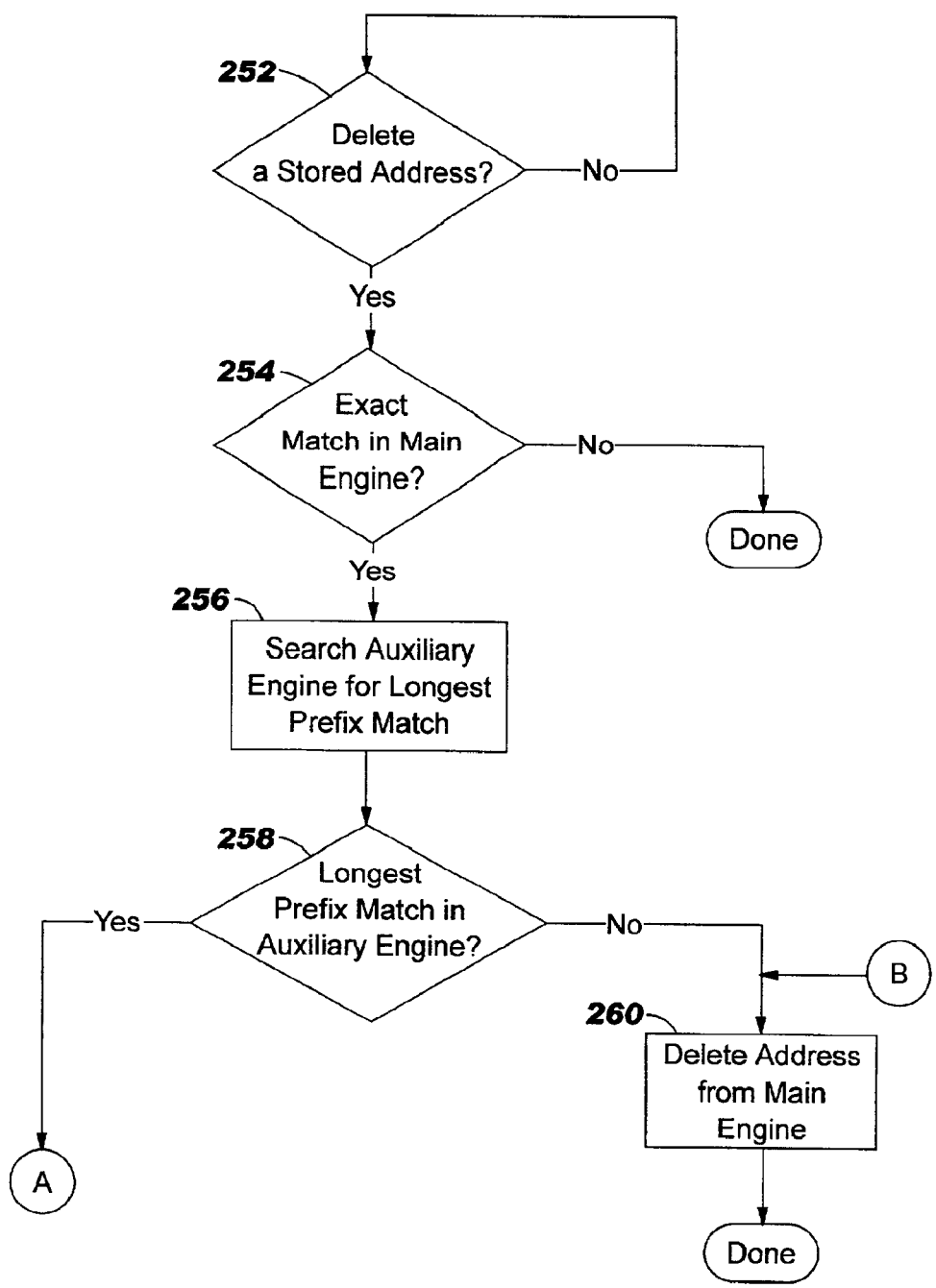

FIGS. 7A and 7B depict a more detailed flow chart of one embodiment of a method 250 in accordance with the present invention for removing items from the main engine 102 of the system 100 in accordance with the present invention. If the main engine 102 is to continue to store all addresses having at least a particular length and which are not prefixes of other addresses, then when an address is deleted from the main engine, the method 250 is used.

It is determined whether there is an address to be deleted, via step 252. If not, then step 252 is repeated. If so, then the main engine 102 is searched to determine whether there is an exact match for the address to be deleted in the main engine, via step 254. If no match is found in the main engine 102, then the deletion is complete. If a match for the address to be deleted is found in the main engine, then the auxiliary engine 104 is searched for the longest prefix match of the address to be deleted, via step 256. It is determined whether the longest prefix match was located in the auxiliary engine, via step 258. Note that steps 256 and 258 could be merged. If no longest prefix match as located in the auxiliary engine 104, then the address is simply deleted from the main engine 102, via step 260. The method 250 then ends. If not, then the length of the longest prefix match in the auxiliary engine 104 is determined, via step 262. It is determined whether the length of the longest prefix match was less than a particular, minimum, length, preferably sixteen bits, via step 264. If the longest prefix match is less than the particular length, then the address is simply deleted from the main engine in step 260. This is because the longest prefix match is too short to be moved to the main engine.

If the longest prefix match is not shorter than the particular length, the index of the address to be deleted from the main engine 102 is determined, via step 266. The index is the most significant bit at which the pattern differs with a pattern in the tree. It is then determined whether the longest prefix match from the auxiliary engine 102 is shorter than the index, via step 268. If so, then the address is simply deleted from the main engine 102 in step 260. If the longest prefix match in the auxiliary engine 104 is not shorter than the index, then the address is deleted from the main engine 102 and the longest prefix match from the auxiliary engine 104 is used to replace the address being deleted, via step 270. Preferably, replacement is accomplished by changing the pointers to point to the longest prefix match. Thus, the longest prefix which is not a prefix of another address stored by the system 100 is effectively put in the main engine to replace the address being deleted. As a result, the desired properties of the main engine 102 are retained. Thus, the capabilities of the system 100 to search quickly and efficiently for the longest prefix match for a key and to be efficiently implemented are retained.

Using the method 200, the system 100 can rapidly and efficiently perform a search of stored addresses for the longest prefix match for a key. Using the methods 210 and 250, the system 100 can maintain the desired properties of the main engine 102 and the auxiliary engine 104, while inserting or deleting addresses. Thus, the system 100 and the methods 200, 210 and 250 can rapidly search for the longest prefix match of a key as well as be implemented more efficiently and easily.

A method and system has been disclosed for determining a longest prefix match for an address. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for finding a longest prefix match for a key in a computer network, the system comprising:
   a main engine for storing a first plurality of addresses and for searching the first plurality of addresses for the longest prefix match for the key, none of the first plurality of addresses being a prefix for another address of the first plurality of addresses; and
   an auxiliary engine for storing and searching a second plurality of addresses, a first address of the second plurality of addresses capable of including the prefix for a second address of the first plurality of addresses or for a third address for the second plurality of addresses, none of the first plurality of addresses being the prefix for any of the second plurality of addresses, each of the second plurality of addresses being distinct from each of the first plurality of addresses.

2. The system of claim 1 wherein the auxiliary engine searches the second plurality of addresses only if the longest prefix match is not found in the main engine.

3. The system of claim 1 wherein a new address is added to the first plurality of addresses if the new address is not the prefix of any of the first plurality of addresses and the new address has a length that is greater than a particular length or if the new address has a length that is greater than a particular length, a particular address of the first plurality of addresses is a prefix of the new address and the length of the new address is greater than an address length of the particular entry.

4. The system of claim 1 wherein if a particular address of the first plurality of addresses is deleted, then a replacement address from the second plurality of addresses in the auxiliary engine is moved to the main engine if the replacement address is a prefix of the particular address, the replacement address has a length greater than a particular length and the length of the address is not shorter than an index for a next bit to test corresponding to an adjacent address next to the particular addresses in the main engine.

5. The system of claim 1 wherein the auxiliary engine is configured to be searched only if the longest prefix match for the key is not found in the main engine.

6. The system of claim 1 wherein the main engine is a direct table having a plurality of table addresses and wherein each of the plurality of table addresses includes a tree.

7. The system of claim 6 wherein the tree is a Patricia tree.

8. The system of claim 1 wherein each of the first plurality of addresses has a first length, each of the second plurality of addresses has a second length and wherein the key is capable of having a maximum length, the first length being at least a particular portion of the maximum length.

9. The system of claim 8 wherein the main engine does not search the first plurality of addresses if an actual length of the key is less than the particular portion of the maximum length.

10. The system of claim 8 wherein the maximum length is thirty-two bits and wherein the first length is sixteen bits.

11. A method for providing a mechanism for finding a longest prefix match for a key in a computer network, the method comprising the steps of:
 (a) providing a main engine for storing a first plurality of addresses and for searching the first plurality of addresses for the longest prefix match for the key, none of the first plurality of addresses being a prefix for another address of the first plurality of addresses; and
 (b) providing an auxiliary engine for storing and searching a second plurality of addresses, a first address of the second plurality of addresses capable of including the prefix for a second address of the first plurality of addresses or for a third address for the second plurality of addresses, none of the first plurality of addresses being the prefix for any of the second plurality of addresses, each of the second plurality of addresses being distinct from each of the first plurality of addresses.

12. The method of claim 11 wherein the auxiliary engine searches the second plurality of addresses only if the longest prefix match is not found in the main engine.

13. The method of claim 11 wherein a new address is added to the first plurality of addresses if the new address is not the prefix of any of the first plurality of addresses and the new address has a length that is greater than a particular length or if the new address has a length that is greater than a particular length, a particular address of the first plurality of addresses is a prefix of the new address and the length of the new address is greater than an address length of the particular entry.

14. The method of claim 11 wherein if a particular address of the first plurality of addresses is deleted, then a replacement address from the second plurality of addresses in the auxiliary engine is moved to the main engine if the replacement address is a prefix of the particular address, the replacement address has a length greater than a particular length and the length of the address is not shorter than an index for a next bit to test corresponding to an adjacent address next to the particular addresses in the main engine.

15. The method of claim 11 wherein the auxiliary engine is configured to be searched only if the longest prefix match for the key is not found in the main engine.

16. The method of claim 11 wherein each of the first plurality of addresses has a first length, each of the second plurality of addresses has a second length and wherein the key is capable of having a maximum length, the first length being at least a particular portion of the maximum length.

17. The method of claim 16 wherein the main engine does not search the first plurality of addresses if an actual length of the key is less than the particular portion of the maximum length.

18. The method of claim 16 wherein the maximum length is thirty-two bits and wherein the first length is sixteen bits.

19. The method of claim 16 wherein the step of providing the main engine (a) further includes the step of:
 (a1) providing a direct table having a plurality of table addresses and wherein each of the plurality of table addresses includes a tree.

20. The method of claim 19 wherein the tree is a Patricia tree.

21. A method for determining a longest prefix match for a key in a computer network, the method comprising the steps of:
 (a) searching a main engine for the longest prefix match, the main engine storing a first plurality of addresses and for searching the first plurality of addresses for the longest prefix match for the key, none of the first plurality of addresses being a prefix for another address of the first plurality of addresses; and
 (b) searching an auxiliary engine for the longest prefix match only if the longest prefix match is not found in the main engine, the auxiliary engine for storing and searching a second plurality of addresses, an entry of the second plurality of addresses capable of including the prefix for an address of the first plurality of addresses or for a second address for the second plurality of addresses, none of the first plurality of addresses being the prefix for any of the second plurality of addresses, each of the second plurality of addresses being distinct from each of the first plurality of addresses.

22. A computer-readable medium containing a program for providing a mechanism for finding a longest prefix match for a key in a computer network, the program including instructions for:
 (a) providing a main engine for storing a first plurality of addresses and for searching the first plurality of addresses for the longest prefix match for the key, none of the first plurality of addresses being a prefix for another address of the first plurality of addresses; and
 (b) providing an auxiliary engine for storing and searching a second plurality of addresses, a first address of the second plurality of addresses capable of including the prefix for a second address of the first plurality of addresses or for a third address for the second plurality of addresses, none of the first plurality of addresses being the prefix for any of the second plurality of addresses, each of the second plurality of addresses being distinct from each of the first plurality of addresses.

23. The computer-readable medium of claim 22 wherein the auxiliary engine is configured to be searched only if the longest prefix match for the key is not found in the main engine.

24. A computer-readable medium containing a program for determining a longest prefix match for a key in a computer network, the program including instructions for:
 (a) searching a main engine for the longest prefix match, the main engine storing a first plurality of addresses and for searching the first plurality of addresses for the longest prefix match for the key, none of the first plurality of addresses being a prefix for another address of the first plurality of addresses; and
 (b) searching an auxiliary engine for the longest prefix match only if the longest prefix match is not found in the main engine, the auxiliary engine for storing and searching a second plurality of addresses, an entry of the second plurality of addresses capable of including the prefix for an address of the first plurality of addresses or for a second address for the second plurality of addresses, none of the first plurality of addresses being the prefix for any of the second plurality of addresses, each of the second plurality of addresses being distinct from each of the first plurality of addresses.

* * * * *